United States Patent [19]
Montillier

[11] 3,811,879
[45] May 21, 1974

[54] PHOTOCONDUCTIVE CHARGE-TRANSFER COMPLEX WITH CRYSTALLIZATION PREVENTER

[75] Inventor: Jean-Pierre Montillier, Manchester, Conn.

[73] Assignee: Pitney-Bowes, Stamford, Conn.

[22] Filed: Dec. 1, 1972

[21] Appl. No.: 311,223

[52] U.S. Cl. .................................................. 96/1.5
[51] Int. Cl. ............................................. G03g 5/06
[58] Field of Search ............................. 96/1.5, 1.6

[56] References Cited
UNITED STATES PATENTS

| | | | |
|---|---|---|---|
| 3,287,119 | 11/1966 | Hoegl | 96/1.5 |
| 3,484,237 | 12/1969 | Shattuck et al. | 96/1.5 |
| 3,684,506 | 8/1972 | Guarnaccio | 96/1.5 |

FOREIGN PATENTS OR APPLICATIONS

| | | | |
|---|---|---|---|
| 990,368 | 4/1965 | Great Britain | 96/1.5 |

Primary Examiner—Roland E. Martin, Jr.
Attorney, Agent, or Firm—William D. Soltow, Jr.; Albert W. Scribner; Peter Vrahotes

[57] ABSTRACT

The invention relates to a photoconductive insulating coating composition, which includes a crystallization prevention agent. The photoresponse of a poly N-vinyl carbazole-trinitrofluorenone charge transfer complex can be improved by increasing the trinitrofluorenone content. This increase is limited by the tendency of the coating to crystallize at a trinitrofluorenone-poly N-vinyl carbazole molar ratio of greater than 1/1. The use of dicarbazolyl cyclobutane as a crystallization prevention agent permits the use of ratios of greater than 1.23/1, even with high curing temperatures.

2 Claims, No Drawings

PHOTOCONDUCTIVE CHARGE-TRANSFER COMPLEX WITH CRYSTALLIZATION PREVENTER

BACKGROUND OF THE INVENTION

1. Field of the Invention

The invention relates to a photoconductor system, and more particularly to a crystallization preventer for an organic photoconductor.

2. Discussion of the Prior Art

In the search for photoconductors, numerous organic materials have been investigated. For example, in U.S. Pat. No. 3,162,532 Hoegl et al discloses the use of a polymer of at least one monovinyl aromatic polynuclear hydrocarbon along with dyestuff sensitizers and activators.

Suitable substituents for these aromatic vinyl compounds are electron-releasing substituents, such as are described by L. F. and M. Fieser, "Organic Chemistry," second edition, page 605, Table I, viz., alkyl groups, such as methyl, ethyl, propyl, butyl, isobutyl, and amyl, alkoxy groups, such as methoxy, ethoxy, propoxy, and butoxy; dialkylamino groups, such as dimethylamino, diethylamino, dipropylamino, and dibutylamino; hydroxyl groups esterified with carboxylic acids, such as acetic acid, and propionic acid, free hydroxyl groups and amino groups. Dialkylamino groups are of particular advantage. Suitable copolymerizates are those of the above aromatic vinyl compounds with each other or with other compounds having polymerizable double bonds, such as acenaphthylene, preferably with mono-nuclear aromatic vinyl compounds, such as styrene and methyl styrene.

The following polynuclear aromatic vinyl compounds are exemplary: vinylnaphthalenes, such as 1-vinylnapthalene, and 2-vinylnaphthalene; vinylanthracenes, such as 1-vinylanthracene, and 9-vinylanthracene; vinyldiphenyls, such as 4-vinyldiphenyl, and 3-vinyldiphenyl; vinyl fluorenes, such as 2-vinylfluorene; vinylacenaphthenes, such as 5-vinylacenaphthene, vinylphenanthrenes, such as 2-vinylphenanthrene, and 3-vinylphenanthrene; vinylpyrenes, such as 3-vinylpyrene; vinylnaphthacenes, such as 2-vinylnaphthacene; vinylperylenes, such as 3-vinylperylene; 6-methoxy-2-vinyl-naphthalene, 1-methoxy-2-vinyl-naphthalene, 4-methoxy-1-vinyl-naphthalene, 6-methoxy-1-vinyl-naphthalene; 9-vinyl-10-methyl-anthracene, 9-vinyl-10-ethyl-anthracene, and 6-acetoxy-2-vinyl-naphthalene.

In U.S. Pat. No. 3,037,861 Hoegl et al discloses a solid polyvinyl carbazole photoconductor. It is disclosed that additives such as dyestuff sensitizer in the proportion of 0.1 to 5 percent weight by weight of photoconductor can be used.

In U.S. Pat. No. 3,484,237 Shattuck et al attributes the increasing interest in the use of organic photoconductors for electrophotographic purposes to the ease of preparing photoconductive plates at low cost and the mechanical flexibility which facilitates the preparation of belt type photoconductor plates. It is further indicated that even with the addition of 1 to 2 percent of an activator as indicated in the U.S. Pat. No. 3,037,861, the sensitivity or exposure speed of a polyvinylcarbazole photoconductive composition is still at least 14 times slower, depending upon the particular activator selected than the exposure speed of selenium used in xerography. Moreover, a subsequent British Pat. No. 990,368 states that the amount of the activator must be limited to less than 100 moles of activator to 1,000 moles of photoconductor because it states that a greater amount of activator causes the dark conductivity to become too high and the photoconductive composition will no longer accept sufficient electrostatic charge to be useful in electrophotography.

Shattuck et al provides an organic photoconductive composition comprising 2, 4, 7-trinitro-9-fluorenone and a polymer of one or more vinyl heterocyclic compounds, in the proportions of 0.49 to 1.23 moles of 2, 4, 7-trinitro-9-fluorenone to 1.0 mole of monomeric unit of vinyl heterocyclic compound.

Such organic photoconductive compositions have a dark conductivity low enough to be more than adequately suited for electrophotography, have significantly enhanced activity, absorb in the visible region of the spectrum so that the addition of dyestuff sensitizers is not necessary, and have good chemical stability. Specifically, compositions within the above formulation can have an exposure speed which is at least 14 times faster than those of polyvinylcarbazole compositions containing 1–2 percent of an activator, and which is comparable to that of selenium (provided a suitable exposure source is used).

However, above a concentration of 1 mole of 2, 4, 7-trinitro-9-fluorenone to 1 mole of monomeric unit of the polymerized vinyl carbazole compound, some of the compositions start to become crystalline and lose their speed.

The negative charge acceptance and the sensitivity of the composition increase with increasing proportions of the fluorenone. The trinitrofluorenone can be used in amounts up to, but not greater than an amount which tends to result in crystallization.

Other prior art includes U.S. Pat. No. 3,684,506 wherein dicarbazolyl cyclobutane is used as a photoconductor with .005 to 1 percent of an electron acceptor to increase the sensitivity of the composition. German Pat. No. 2,126,660 discloses the combination of halogenated poly-N-vinyl carbazole and a number of electron acceptors as a photoconductor.

Still other prior art patents disclosing the use of carbazolyl compounds or of polyvinyl carbazole are U.S. Pat. Nos. 3,159,483, 3,287,119, 3,099,060 and 3,607,258. It is disclosed in U.S. Pat. No. 3,287,119 that 2, 4, 7-trinitro-9-fluorenone or 2, 4, 5, 7-tetranitro-9-fluorenone may be used as an electron acceptor. Use of 2, 4, 7-trinitro-9-fluorenone as an electron acceptor is also disclosed in U.S. Pat. No. 3,607,258.

SUMMARY OF THE INVENTION

This invention relates to a photoconductive insulating composition comprising a charge transfer complex of a Lewis acid and a vinyl heterocyclic aromatic polymer or a poly vinyl nuclear aromatic polymer which is stabilized by a small amount of a dicarbazolyl compound to prevent crystallization of the composition. The preferred Lewis acid is 2, 4, 7-trinitro-9-fluorenone or 2, 4, 5, 7-tetranitro-9-fluorenone and a preferred polymer is poly-N-vinyl carbazole or halogenated poly-N-vinyl carbazole. The preferred dicarbazolyl compound is dicarbazolyl cyclobutane.

In accordance with the present invention, a photoconductive coating composition is provided comprised of (a) a photoconductive chemical complex consisting of trinitrofluorenone, and a polymer of one or more vinyl heterocyclic compounds in the proportion of greater than 1.23 moles of trinitrofluorenone per mole of monomeric unit of vinyl heterocyclic compound, and (b) a small but effective amount of a dicarbazolyl compound used as a crystallization preventer. The crystallization preventer is present in sufficient quantity so that the resultant photoconductive coating composition is substantially free of regions of crystallization, even after extensive curing.

DESCRIPTION OF THE PREFERRED EMBODIMENT

The photoconductive material adaptable for use in electrophotographic processes includes an electron donor and an electron acceptor in the form of a charge transfer complex. While the mechanism of the complex chemical interaction involved in the present process is not completely understood, it is believed that a "charge transfer complex" is formed having absorption bands characteristic of neither of the two components considered seems to have a synergistic effect which is much greater than additive.

The electron donor can be a polymer of one or more vinyl heterocyclic compounds, as for example, a polymerized vinyl carbazole.

Polymerized vinylcarbazole compounds suitable for use in the present invention are poly-N-vinylcarbazole and polyvinyl-N-lower alkylcarbazoles. Poly-N-vinylcarbazole has the following structural formula:

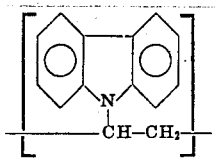

Polyvinyl-N-lower alkylcarbazoles have the following structural formula:

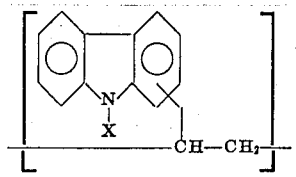

wherein X is a lower alkyl. (The above numbering is based on the International Union of Pure and Applied Chemistry – Definitive Rules for Nomenclature of Organic Compounds, JACS 82, 5,545–5,574, 5,568 (1960). Examples of polyvinyl-N-lower alkylcarbazoles are poly-2-vinyl-N-methylcarbazole, poly-3-vinyl-N-ethylcarbazole, poly-2-vinyl-N-ethylcarbazole, poly 3-vinyl-N-methylcarbazole, poly-3-vinyl-N-isopropylcarbazole, poly-2-vinyl-N-butylcarbazole, poly-3-vinyl-N-butylcarbazole, poly-2-vinyl-N-pentylcarbazole, poly-3-vinyl-N-pentylcarbazole, poly-2-vinyl-N-hexylcarbazole, poly-3-vinyl-N-hexylcarbazole, poly-2-vinyl-N-heptylcarbazole, and poly-3-vinyl-N-heptylcarbazole. Mixtures of polymerized vinyl-carbazole compounds, and copolymers of the vinyl-carbazole monomers, also may be used.

Other vinyl heterocyclic polymers are also suitable such as vinyldibenzofuran polymers and specifically poly-4-vinyldibenzofuran.

Poly-N-vinylcarbazole, which is the preferred polymer, is an addition polymerization product of N-vinylcarbazole and is commercially available from Badische Anilin-und Sodafabrick A.G., Ludwigshafen/Rhein, under the registered trademark Luvican. A method of producing poly-N-vinylcarbazole is described in U.S. Pat. No. 2,072,465.

The electron acceptor may be any suitable Lewis acid and the preferred group of Lewis acids are 2, 4, 7-trinitro-9-fluorenone; 2, 4, 5, 7-tetranitro-9-fluorenone; 2, 6-dichloro-p-benzoquinone; 2, 5-dinitro-9-fluorenone; 1,5-dichloro-2, 4-dinitrobenzene; 2, 5-dichloro-p-benzoquinone; 2, 3, 6-trichloro-p-benzoquinone; 2-chloro-3, 5-dinitropyridine; 2, 4, 5, 7, 9-pentanitroindene; 2, 1-alpha 7-fluorenone-11, 12-dione; 2, 5-diphenyl-p-benzoquinone; 2, 3-dichloro-1, 4-naphthoquinone; 9-dicyanomethylene 2, 4, 7-trinitrofluorene. Of these the most preferred are 2, 4, 7-trinitro-9-fluorenone and 2, 4, 5, 7-tetranitro-9-fluorenone. These two electron acceptors give substantially increased electrophotographic speed over those listed above or with respect to Lewis acids in general.

Other typical Lewis acids are: quinones, such as p-benzoquinone, chloranil, naphthoquinone-(1,4), 2,3-dichloronaphthoquinone-(1,4), anthraquinone, 2-methyl-anthraquinone, 1,4-dimethylanthraquinone, 1-chloroanthraquinone, anthraquinone-2-carboxylic acid, 1,5-dichloroanthraquinone, 1-chloro-4-nitroanthraquinone, phenanthrenequinone, acenaphthenequinone, pyranthrenequinone, chrysenequinone, thio-naphthenequinone, anthraquinone-1,8-disulfonic acid and anthraquinone-2-aldyhyde; triphthaloylbenzene-aldehydes such as bromal, 4-nitrobenzaldehyde, 2,6-dichlorobenzaldehyde-9, 2-ethoxy-1-naphthaldehyde, anthracene-9-aldehyde, pyrene-3-aldehyde, oxindole-3-aldehyde, pyridine-2,6-dialdehyde, biphenyl-4-aldehyde; organic phosphonic acid such as 4-chloro-3-nitrobenzene-phosphonic acid, nitrophenols, such as 4-nitrophenol, and picric acid; acid anhydrides, for example, acetic-anhydride, succinic anhydride, maeic anhydride, phthalic anhydride, tetrachlorophthalic anhydride, perylene-3,4,9,10-tetracarboxylic acid and chrysene-2,3,8,9-tetracarboxylic anhydride, di-bromo maleic acid anhydride, metal halides of the metals and metalloids of the groups IB, II through to group VIII of the periodical system, for example: aluminum chloride, zinc chloride, ferric chloride, tin tetrachloride, (stannic chloride), arsenic trichloride, stannous chloride, antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride, arsenic tri-iodide; boron halide compounds, for example: boron tri fluoride, and boron trichloride; and ketones, such as acetophenone, benzophenone, 2-acetylnaphthalene, benzil, benzoin, 5-benzoyl acenaphthene, biacene-dione, 9-acetyl-anthracene, 9-benzoyl-anthracene, 4-(4-dimethyl-amino-cianamyl)-1-acetylbenzene, acetoacetic acid anilide, indandione-(1,3), 1,3-diketo-hydrindene, acenaphthene quinone-dichloride, anisil, 2,2-pyridil and furil.

Additional Lewis acids are mineral acids such as they hydrogen halides, sulphuric acid and phosphoric acid; organic carboxylic acids, such as acetic acid and the substitution products thereof, monochloro-acetic acid, dichloroacetic acid, trichloro-acetic acid, phenylacetic acid, and 6-methylcoumarinylacetic acid (4); maleic acid, cinnamic acid, benzoic acid, 1-(4-diethyl-amino-benzoyl)-benzene-2-carboxylic acid, phthalic acid, and tetra-chlorophthalic acid, alpha-beta-dibromo-beta-formyl-acrylic acid (mucobromic acid), dibromo-maleic acid, 2-bromo-benzoic acid, gallic acid, 3-nitro-2-hydroxyl-1-benzoic acid, 2-nitro phenoxy-acetic acid, 2-nitro-benzoic acid, 4-nitro-benzoic acid, 3-nitro-4-ethoxy-benzoic acid, 2-chloro-4-nitro-1-benzoic acid, 3-nitro-4-methoxy-benzoic acid, 4-nitro-1-methyl-benzoic acid, 2-chloro-5-nitro-1-benzoic acid, 3-chloro-6-nitro-1-benzoic acid, 4-chloro-3-nitro-1-benzoic acid, 5-chloro-3-nitro-2-hydroxybenzoic acid, 4-chloro-2-hydroxy-benzoic acid, 2,4-dinitro-1-benzoic acid, 2-bromo-5-nitro-benzoic acid, 4-chlorophenyl-acetic acid, 2-chloro-cinnamic acid, 2-cyanocinnamic acid, 2,4-dichlorobenzoic acid, 3,5-dinitro-benzoic acid 3,5-dinitro-salicylic acid, malonic acid, mucic acid, acetosali-cylic acid, benzilic acid, butane-tetra-carboxylic acid, citric acid, cyano-acetic acid, cyclo-hexane-dicarboxylic acid, cyclo-hexane-acid, lenulinic acid (levulic acid), malic acid, succinic acid, alpha-bromo-stearic acid, citraconic acid, dibromo-succinic acid, pyrene-2,3,7,8-tetra-carboxylic acid, tartaric acid; organic sulphonic acids, such as 4-toluene sulphonic acid, and benzene sulphonic acid, 2,4-dinitro-1-methyl-benzene-6-sulphonic acid, 2,6-dinitro-1-hydroxy-benzene-4-sulphonic acid, 2-nitro-1-hydroxybenzene-4-sulphonic acid, 4-nitro-hydroxy-2-benzene sulphonic acid, 3-nitro-2-methyl-1-hydroxy-benzene-5-sulphonic acid, 6-nitro-4-methyl-1-hydroxy-benzene-2-sulphonic acid, 4-chloro-1-hydroxy-benzene-3-sulphonic acid, 2-chloro-3-nitro-1-methyl-benzene-5-sulphonic acid and 2-chloro-1-methyl-benzene-4-sulphonic acid.

The photoconductive chemical complex of this invention is prepared by reacting the Lewis acid and the vinyl heterocyclic aromatic polymer or poly vinyl nuclear aromatic polymer in amounts which yield a complex possessing satisfactory photoconductive properties. It has been found however, when 1 or more moles of the Lewis acid, i.e., trinitrofluorenone, are reacted with 1.0 mole of monomeric unit of vinyl heterocyclic polymer, i.e., poly-N-vinyl carbazole, the resultant photoconductive chemical complex begins to undergo crystallization and hence, becomes unusable as a photoconductive coating composition.

I have now discovered a method and novel composition which avoids the occurrence of crystallization in such photoconductive coating compositions. More particularly, I have found that crystallization can be avoided completely, even when the molar ratio of the trinitrofluorenone to the poly-N-vinyl carbazole is in excess of 1.23/1, by the addition to said photoconductive chemical complex of a small but effective amount of a crystallization inhibitor which is a dicarbazolyl compound of the formula:

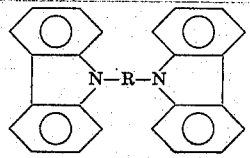

wherein R is cycloalkyl and preferably cyclobutyl.

The preferred dicarbazolyl cyclobutane (DCC) crystallization inhibitor, may be synthesized by the following process which is a modification of the basic process disclosed by Shirola et al in Chemical Communications, page 1,110 (1970), as follows. A one liter photochemical reaction vessel is fitted with a 450 watt Hanovia high pressure mercury vapor lamp, a pyrex filter, an air inlet tube and a stirrer. The vessel is filled with a solution of 100 grams of mono-N-vinyl carbazole (from Borden Chemicals) in 500 ml of acetone. The solution is then irradiated for about 10 minutes at room temperature with a moderate flow of air through the solution. After 10 minutes a precipitate of 1, 2-dicarbazolyl cyclobutane begins to appear and with continued irradiation and bubbling of air through the solution the reaction is completed in about 30 minutes. The precipitate is filtered and rinsed with methanol and if desired it can be recrystallized from acetone. The precipitate is practically pure dicarbazolyl cyclobutane (melting point 196° C.) and the yield is about 70 to 80 percent based on the weight of mono-N-vinyl carbazole.

The amount of the crystallization preventer, for example, dicarbazolyl cyclobutane which may be satisfactorily employed in the practice of this invention is the amount determined by the skilled worker to provide a final product having desirable photoconductive speed, and depends on the related molar amounts of the components present in the photoconductive chemical complex. Generally speaking, in the practice of this invention, I have found that satisfactory results are obtained when the crystallization inhibitor is present in an amount equal to from about 2 to about 50 percent by weight of the final composition of this invention and most satisfactory results are obtained when the crystallization inhibitor is present in an amount equal to from about 2 to about 10 percent by weight of the final composition of this invention.

In summary therefore, my invention comprises a photoconductive coating composition which comprises (a) from 98 to 50 percent by weight of a photoconductive chemical complex consisting of a Lewis acid, for example, trinitrofluorenone, and a polymer of a vinyl heterocyclic compound, for example, poly-N-vinyl carbazole, wherein there is at least one or more moles of the Lewis acid for each mole of monomeric unit of vinyl heterocyclic compound; and (b) having incorporated therein from about 2 to 50 percent by weight of a crystallization inhibitor having the formula:

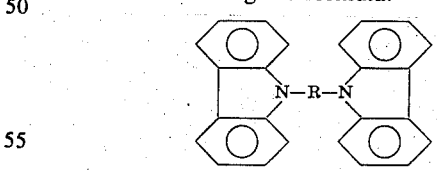

where R is cycloalkyl, and preferably, said crystallization inhibitor being dicarbazolyl cyclobutane. The invention may be further illustrated by the following examples:

EXAMPLE I

To a solution of 2 grams (gm) (1.035 × 10$^{-2}$ mole carbazolyl unit) of poly-N-vinyl carbazole in 20 milliliters (ml) of tetrahydrofuran, is added 4.8 gm (1,525 × 10$^{-2}$ mole) of 2, 4, 7-trinitro-9-fluorenone with 5 ml of tetrahydrofuran. After stirring for 15 minutes, the solution is divided into two parts. Part A is used as a reference solution. To part B is added 0.34g (0.088 × $10^{-2}$ mole) (4.8 percent by weight) of dicarbazolyl cyclobutane. With a doctor blade set at a 2 mil gap, solutions A and B were coated on a 3 mil aluminized Mylar sheet. The coatings produced from the A solution showed crystallization almost immediately upon curing in an oven at 70° C. The coatings produced from the B solution stayed amorphous even after extensive curing. The molar ratio of poly-N-vinyl carbazole/trinitrofluorenone/dicarbazolyl cyclobutane in solution A was 1/1.47/0 and in solution B was 1/1.47/0.085 well above the cyrstallization point as indicated in the Shattuck et al U.S. Pat. No. 3,484,237.

EXAMPLE II

The procedure of Example I was followed, except that 6.3 gm (2.0 × $10^{-2}$ mole) of 2, 4, 7-trinitro-9-fluorenone was used with 10 ml. of tetrahydrofuran. In this case the weight percent of dicarbazolyl cyclobutane was 3.9 percent. The solution was again divided into two parts A and B and coated as in Example I. The coatings from solution A crystallized immediately, even without being subjected to curing. The solution B coatings stayed amorphous even after extensive curing. The molar ratio of poly-N-vinyl carbazole/trinitro fluorenone/dicarbazolyl cyclobutane was 1/1.93/0 for solution A and 1/1.93/0.085 for solution B.

The solution B coatings of Examples I and II were tested and found to have a speed equal to that of the 1/1 molar ratio formulation of the prior art, and were easier to form into electrophotographic coatings because of faster curing possible at higher temperatures. The higher curing temperatures can be used without the risk of crystallization when dicarbazolyl cyclobutane is used as a crystallization preventer.

What is claimed is:

1. A photoconductive coating composition which comprises:
    A. from about 50 to 98 percent of a photoconductive chemical complex consisting of a Lewis acid selected from the group consisting of 2,4,7-Trinitro-9-fluorenone and 2,3,5,7-Tetranitro-9-fluorenone and a polymer of a vinyl heterocyclic compound selected from the group consisting of poly-N-vinyl carbazole and halogenated poly-N-vinyl carbazole, wherein at least one or more moles of the Lewis acid are complexed with each mole of monomeric unit of the vinyl heterocyclic compound; and
    B. from about 2 to 50 percent of a dicarbazolyl crystallization inhibitor of the formula:

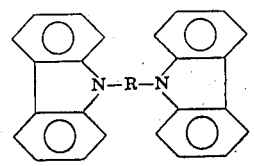

wherein R is cyclobutyl.

2. The composition of claim 1 wherein the photoconductive chemical complex consists of 2,4,7-trinitro-9-fluorenone and poly-N-vinyl carbazole; and the crystallization inhibitor is dicarbazolyl cyclobutane.

* * * * *